T. LIDBERG.
CONSTANT TEMPERATURE WATER BATH.
APPLICATION FILED FEB. 23, 1918.

1,397,766. Patented Nov. 22, 1921.
4 SHEETS—SHEET 1.

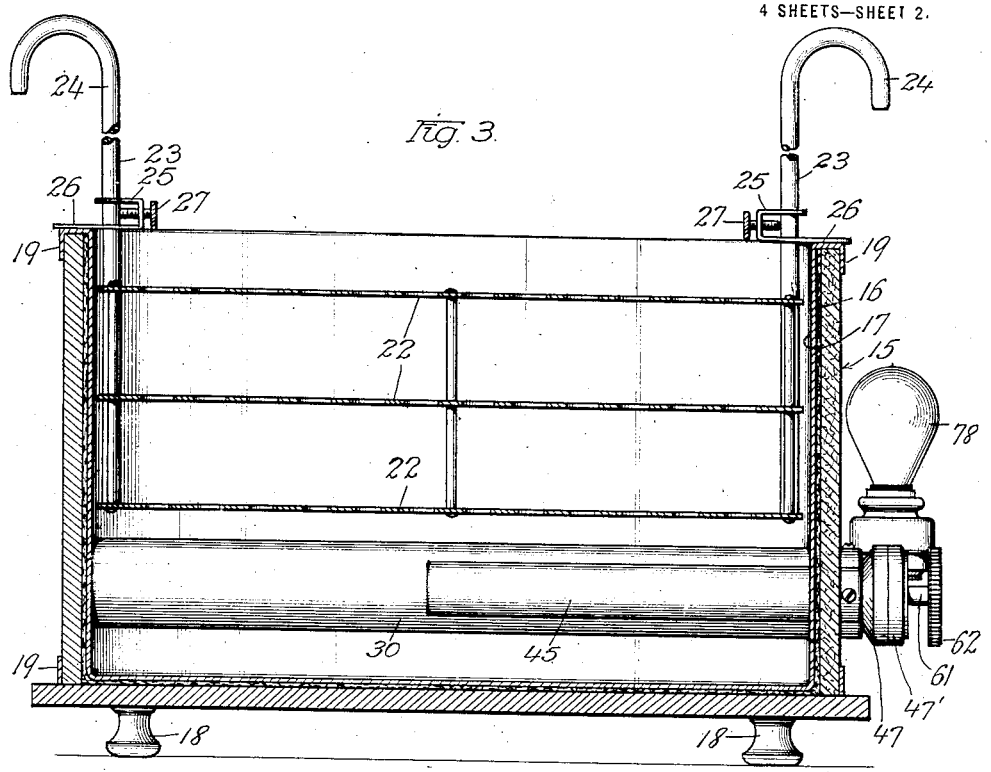
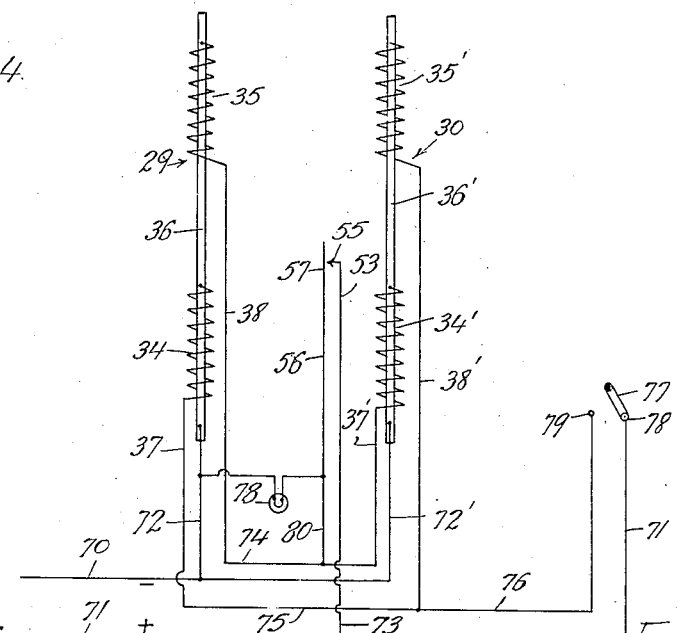

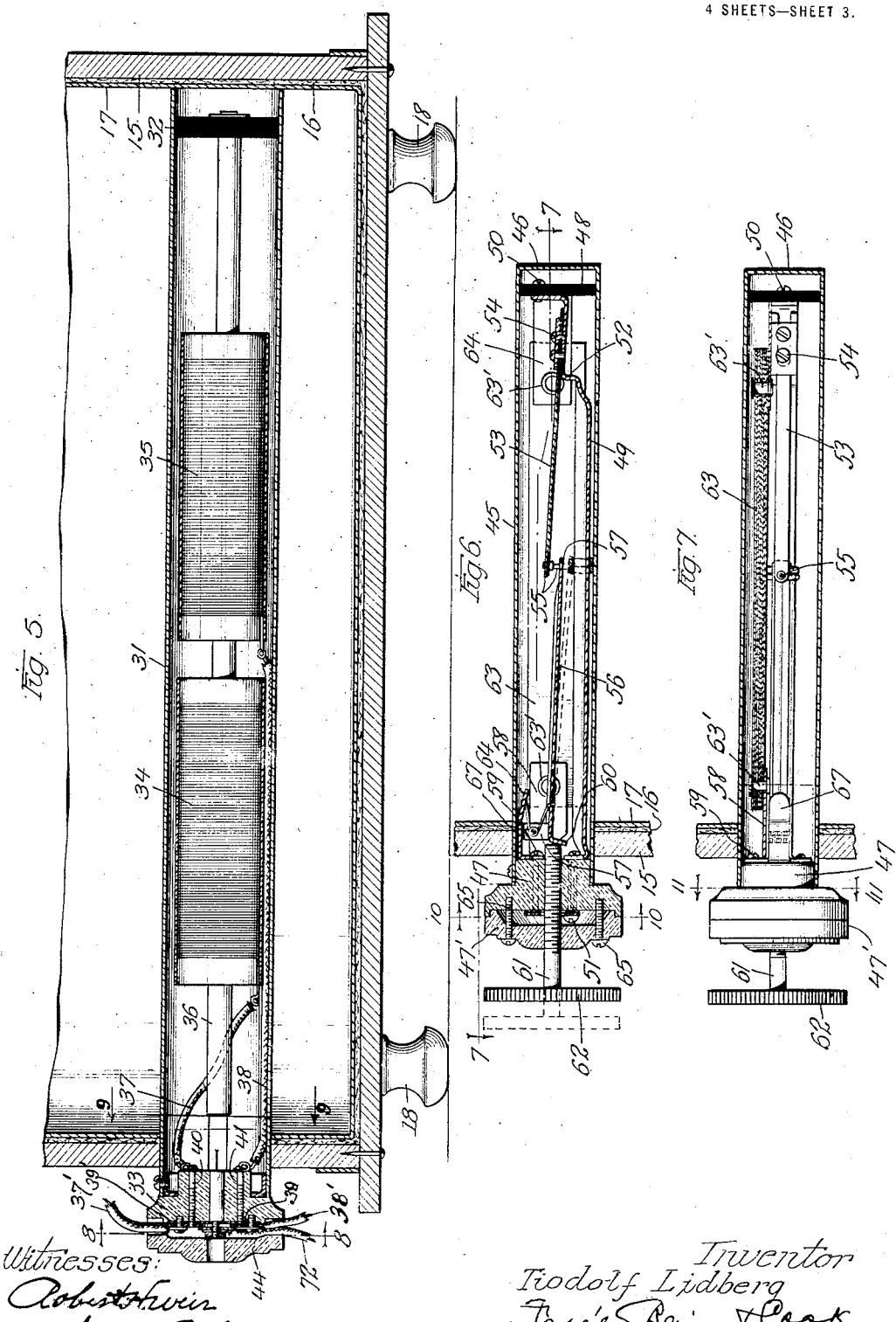

T. LIDBERG.
CONSTANT TEMPERATURE WATER BATH.
APPLICATION FILED FEB. 23, 1918.

1,397,766.

Patented Nov. 22, 1921.
4 SHEETS—SHEET 4.

Witnesses:
Robert H. Weir
Arthur W. Carlson

Inventor
Rodolf Lidberg
Jones, Bain & Cook
Attys.

UNITED STATES PATENT OFFICE.

TIODOLF LIDBERG, OF CHICAGO, ILLINOIS, ASSIGNOR TO CHICAGO SURGICAL & ELECTRICAL COMPANY, OF CHICAGO, ILLINOIS, A CORPORATION OF ILLINOIS.

CONSTANT-TEMPERATURE WATER-BATH.

1,397,766.  Specification of Letters Patent.  Patented Nov. 22, 1921.

Application filed February 23, 1918. Serial No. 218,741.

*To all whom it may concern:*

Be it known that I, TIODOLF LIDBERG, a citizen of the United States, residing at Chicago, in the county of Cook and State of Illinois, have invented certain new and useful Improvements in Constant-Temperature Water-Baths, of which the following is a specification.

My invention relates to improvements in constant temperature water baths and has especial reference to electro-thermal means for automatically maintaining the water at a predetermined constant temperature.

One of the objects of my invention is to provide a device especially designed for therapeutic purposes; for bacteriological uses and other similar service.

Another object of my invention is to provide a device having the parts arranged conveniently for use and each part self contained and independently separable and to reduce the cost of construction as much as may be consistent with the character of the device and the advantages attained.

Other and further objects of my invention will become readily apparent, to persons skilled in the art, from a consideration of the following description when taken in conjunction with the drawings, wherein:—

Fig. 3 is a section taken on line 3—3 of Fig. 2.

Fig. 4 is a diagram of circuit.

Fig. 5 is a longitudinal section of one of the heating devices, of which there are two, taken on line 5—5 of Fig. 2.

Fig. 6 is a longitudinal section of the temperature-responsive, current-controller, taken on line 6—6 of Fig. 2.

Fig. 7 is a similar view of the same device taken on line 7—7 of Fig. 6.

In all the views the same reference characters are employed to indicate similar parts.

Figure 1:
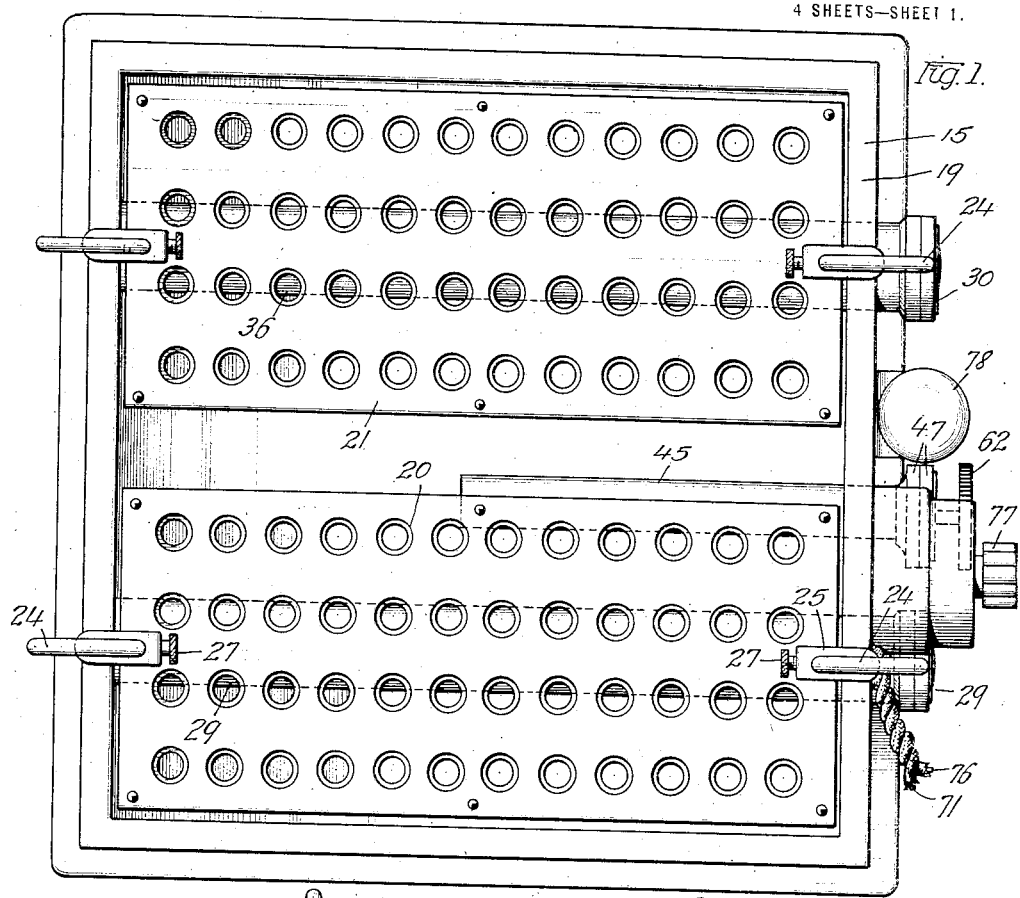
Figure 1 shows a plan view of the device with the parts assembled.
Figure 2:
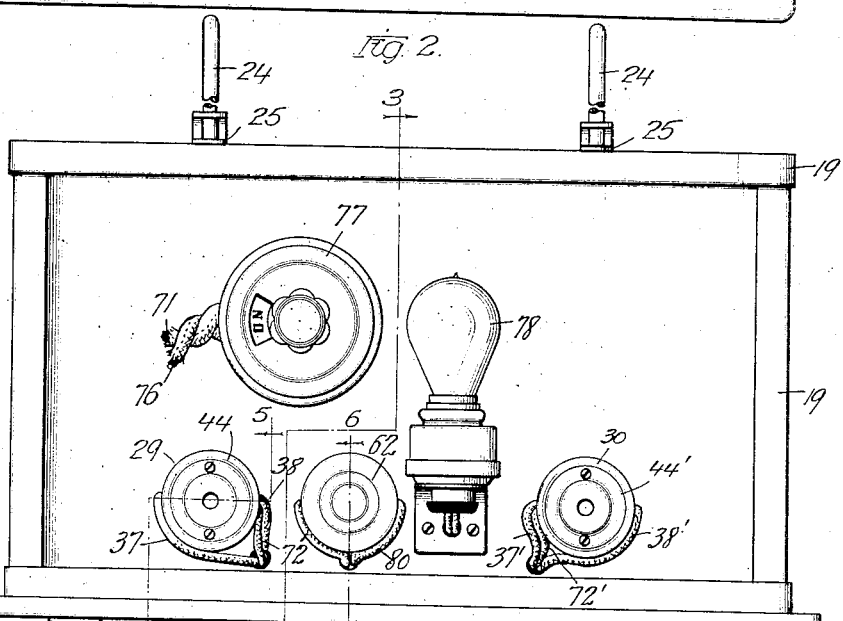
Fig. 2 is an end elevation.

The water container consists of a rectangular box 15, the outer walls of which are preferably composed of a fibrous board, properly secured together and having a lining 16 of hair felt, or cloth, serving as a heat insulator, and inside of this lining is a sheet metal container 17, preferably of copper, or the like. This structure is mounted upon four knobs, or legs 18, to raise it above the support upon which it may rest. The side walls of the metal receptacle 17 are made somewhat longer than the side walls 15 of the structure and are turned over at the upper edges, as at 19, to form an edge-protecting bead or border. A plurality of perforate trays, such as 20 and 21, each consisting of a plurality of shelves 22, are supported within the receptacle. To each of the separate trays is secured a vertically extending rod 23, turned over at its end, as at 24, as a convenient means for lifting it from the receptacle, and each of the rods is provided with sliding clips 25, each of which has a projecting end 26, to rest upon the upper edge of the wall of the receptacle, and each is provided with a screw 27 by which the clip may be adjusted at any height upon the rod 23 to vary the submergence of the tray.

Figure 8:
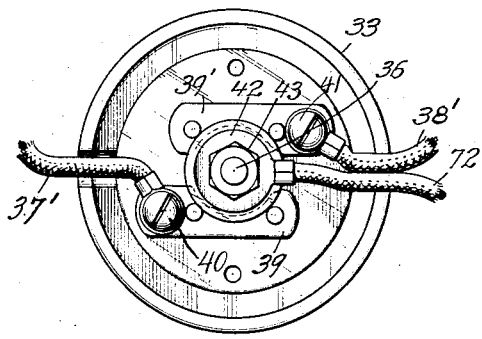
Fig. 8 is an end view of the heating element with the cap removed, as shown on line 8—8 of Fig. 5.
Figure 9:
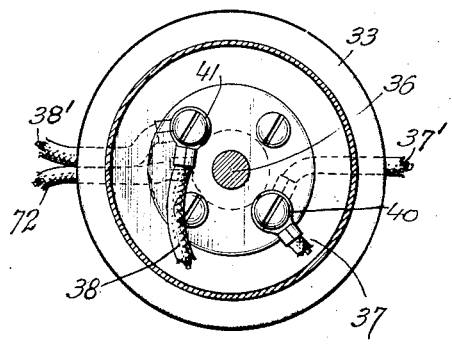
Fig. 9 shows the end view of the heater head.
Figure 10:
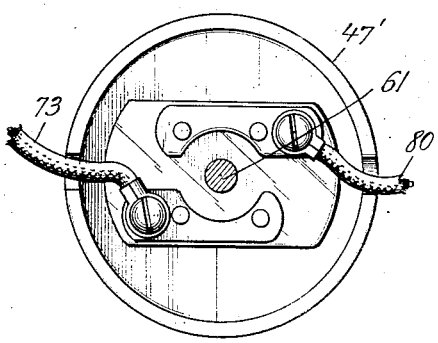
Fig. 10 is an end view of the head, of the current controller.
Figure 11:
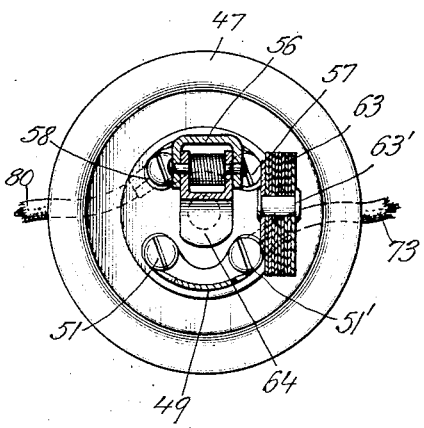
Fig. 11 is a face view of the inner surface of the head of the current controller.

There are preferably two heating devices 29 and 30 in the receptacle. These heating elements are substantially duplicates and each comprises a tube 31 closed at one end by being soldered to the side wall of the receptacle and containing a disk 32 of insulating material, and the other end is closed by a head 33. Inside of the tube 31 are located two heating units or coils 34 and 35. These coils are wound about a rod 36, that is supported axially in the tube. One terminal of each of the coils is connected to the rod 36; the other terminals 37 and 38, respectively, are connected to plates 39 and 39', respectively, by screws 40 and 41, that are secured to the front face of the head 33, as more clearly shown in Fig. 8. The rod 36 of each of the heating elements is connected to a terminal 42 by a nut 43.

A cap plate 44 is placed over the head 33 and protects the terminals of the heating element from contact by the user.

A thermo-responsive device 45 comprising a tube is closed at its inner end 46 and is provided on its outer end with an insulating head 47. Located in the tube, near the closed inner end is an insulating disk 48, to which is connected a strip 49, as by screws 50. It is also connected at its outer end to the head 33 by screws 51. The strip is bent near its inner end, as at 52, to provide a support for a thermostatic bar 53, which is secured thereto by screws 54. This thermostatic bar is provided with a contact 55, on its free end, for closing an electric circuit with a contact 57 on an adjustable finger or bar 56. This latter finger or bar is pivoted on a bracket 58, and is provided with a double tongue 57 projecting laterally therefrom for the purpose. The bracket 58 is secured to the head 47 by screws 59. The adjustable bar 56 is provided with a laterally turned end 60 for coöperation with the adjusting screw 61, which is rotatable by the head 62. A condenser 63 is connected to the bracket 58 by a hollow rivet 63' and to a bracket 64 by a similar rivet. The condenser bridges the contacts 55 and 57 and prevents excessive spark that otherwise would result when the circuit is broken by these contacts. A spring 64', one end of which bears against the tongue 67, the latter being a part of the bracket 58, holds the bar 56 in its normal dotted line position, shown in Fig. 6. The operation of the screw 61 upon the outturned end 60 of the bar, tends to move the bar, against the yielding effect of the spring, into full line position and when the screw is retracted the spring 64' moves it in the opposite direction. The object of moving the bar 56 is to adjust the device so that the circuit will be opened between the contacts 55 and 57, when the temperature of the bath has reached a predetermined degree.

The operation of the thermostatic device will be readily understood by persons skilled in the art. The tube in which the device 45 is contained is filled, of course, with atmospheric air, the temperature of which is varied by the temperature of the bath in which the tube is submerged and the air has its effect upon the thermostatic bar 53, to deflect it to a greater or less degree, the end 55 of which is moved laterally by the varying changes of temperature.

Now referring to diagram of circuit in Fig. 4, the wires 70 and 71 are connected to the source of current supply. The rods 36 and 36' are connected to the wire 70 by wires 72 and 72', respectively. The wire 71 is connected to the thermostatic bar 53 by the wire 73 and the adjustable bar 56 is connected to the wire 74, by the wire 80.

When the circuit is first closed the current will pass from the wire 71 over the wire 73 and through the thermostatic bar 53 and through contacts 55 and 57 to the adjustable bar 56, from thence to the wire 74, and through the coils or heating units 35 and 34' to their respective rods 36 and 36', and over the wires 72 and 72' to the wire 70, thus connecting the coils 35 and 34' in parallel and leaving out the units 34 and 35'. Now should it be desired to energize all four of the coils the switch 77 is closed. Circuit will then be completed from the wire 71 to the switch over the bar 77 to the contact 79 of the switch and over the wire 76. Current will flow from the wire 76 through the wires 38' and 37 into the coils 35' and 34, respectively, back to their rods 36 and 36' and from thence over the wires 72 and 72' to the main wire 70, thus closing the circuit through the coils 34 and 35', when the switch 77 is closed. The switch 77 controls the coils 34 and 35' while the thermostatic bar 53 and the adjustable bar 56 control the coils 34' and 35.

When the device is first placed in circuit and the switch 77 is closed, all of the coils will perform their heating functions. After the bath has been raised in temperature to maintain it constantly, the switch 77 may be opened and then the coils 35 and 34' will be sufficient to maintain the bath at the temperature desired.

A lamp 78, which indicates when the circuit is closed through the device, is connected to the wires 72 and 80, so that it will burn at all times when any current passes through the device.

If only the coils 35 and 34' are to be in service, the thermostatic bar 53 will operate to vary the duration of time in which these coils are energized, for the purpose of maintaining a constant temperature, and when all of the coils are placed in circuit the thermostatic bar will have the same effect on the same number of coils, to vary the number of coils that are to contribute their heat. When the switch 77 is closed the coils 35' and 34 are unaffected by the thermostatic device.

While I have herein shown a single embodiment of my invention for the purpose of clear disclosure it is manifest that various changes in the configuration and the disposition of the parts may be made within the scope of the appended claims.

Having described my invention, what I claim is:—

1. A device of the character described comprising a receptacle having oppositely positioned vertical walls; a plurality of water tight tubes extending across said receptacle and supported at their respective ends by the walls and each tube open at one end outside of said receptacle; a heating element carrying terminals on its outer end insertible in one said tube and a thermal-responsive device carrying terminals on its outer end insertible in another tube whereby to control the heat produced by the heating element through an intermediate medium to be inserted in said receptacle.

2. A device of the character described comprising a receptacle having oppositely positioned vertical walls; a plurality of water tight tubes extending across said receptacle, supported at their respective ends by the walls and each tube open at one end outside of said receptacle; and a heating element carrying terminals on its outer end insertible in one said tube and a thermal-responsive device carrying terminals on its outer end insertible in another said tube and means extending beyond the outer end of said responsive device to adjust the circuit controlling members thereof.

In testimony whereof I hereunto set my hand.

TIODOLF LIDBERG.